March 8, 1932.  J. H. POWERS  1,848,837
MOUNTING FOR FLEXIBLE CONDUCTORS
Filed March 6, 1930
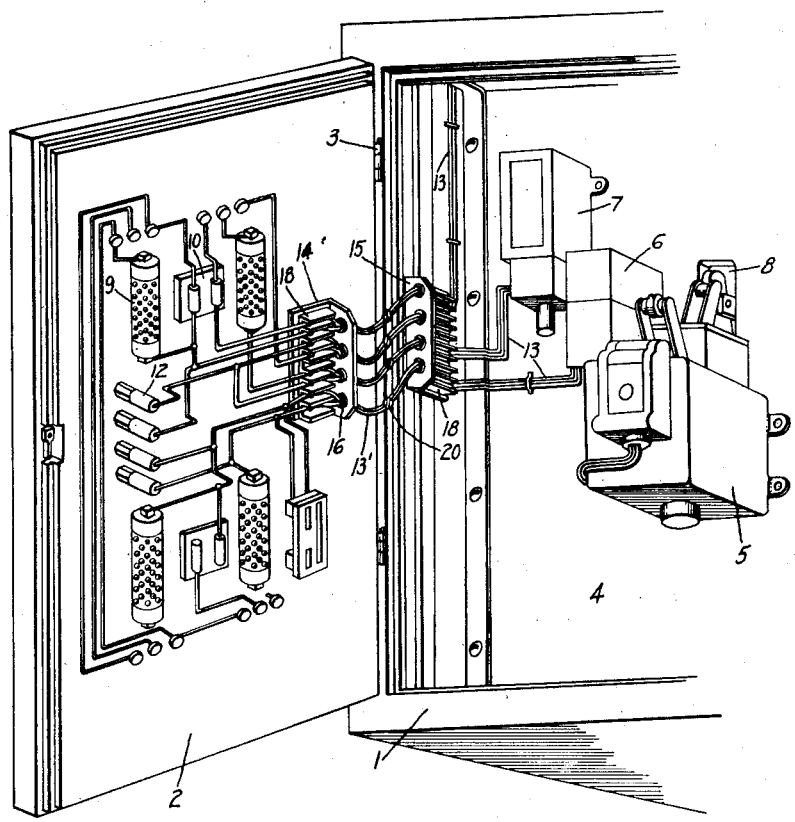
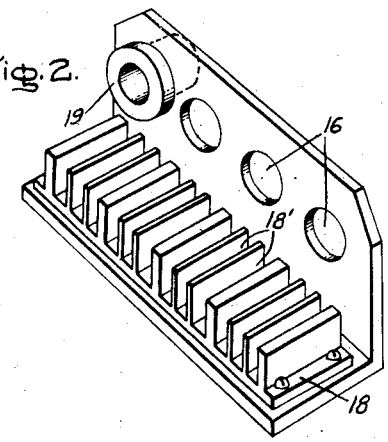
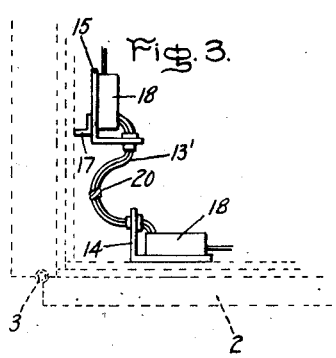
Inventor:
James H. Powers,
by Charles E. Mullan
His Attorney.

Patented Mar. 8, 1932

1,848,837

UNITED STATES PATENT OFFICE

JAMES H. POWERS, OF YEADON, PENNSYLVANIA, ASSIGNOR TO GENERAL ELECTRIC COMPANY, A CORPORATION OF NEW YORK

MOUNTING FOR FLEXIBLE CONDUCTORS

Application filed March 6, 1930. Serial No. 433,780.

My invention relates to a mounting for flexible low-tension lead conductors, and more particularly to a mounting for flexible conductors incorporated in cubicle type switch panels wherein the conductors interconnect control and operating mechanism mounted on the stationary structure, and electrical apparatus mounted on a panel hinged to the stationary structure.

In bringing flexible leads from the stationary structure of cubicle type switch panels to the instrument panel hinged with respect thereto, many difficulties have been encountered due to flexing and bending of the conductors during the closing and opening of the instrument panel. Various methods of mounting the flexible conductors on the stationary structure of the cubicle and on the instrument panel have been used, one of which includes arranging the flexible lead conductors in large conductor cables having the ends thereof connected to terminal blocks on the stationary structure and panel, respectively. Although the cable was provided with considerable slack in this arrangement for permitting bending and flexing thereof, the continued binding and bending stresses due to opening and closing of the panel finally broke down the installation. In such an event, the only remedy which was offered was to replace the cable connection at intervals. Another disadvantage of this method is that of cost in tracing the connections of the cable during installation. Also, due to the large amount of slack required in the cable loop, this arrangement occupies considerable space within the cubicle.

In another method, the flexible leads between the terminal blocks on the panel and stationary housing were mounted individually thereon and provided with considerable slack in order to reduce the bending and flexing stresses. Due, however, to the unnecessary length of the conductor loops they were apt to catch in the panel jamb when the panel was swung closed, resulting in damage to the insulation.

A principal object of my invention is the provision of an improved mounting for low-tension, flexible, lead conductors extending between a stationary structure and a panel hinged thereon which shall be simple in construction, neat in appearance and which shall protect the flexible conductors from injury due to normal operation of the panel.

My invention will be more fully set forth in the following description referring to the accompaying drawings, and the features of novelty which characterize my invention will be pointed out with particularity in the claims annexed to and forming a part of this specification.

Referring to the drawings, Fig. 1 is a perspective view of a cubicle embodying my invention; Fig. 2 is an enlarged perspective view of conductor mounting structure illustrated in Fig. 1; and Fig. 3 is a view illustrating the conductor mounting means in the closed position of the cubicle.

In Fig. 1 there is illustrated a switch panel of the cubicle type comprising a stationary cell-like structure 1 and a movable panel 2 mounted as by the vertically hinged connections 3 to the stationary structure. The stationary cell structure is provided with a partition 4 having mounted on the front side thereof operating and controlling mechanism, as the solenoid operating mechanism 5, auxiliary switches 6 operatively associated with the operating mechanism, and a control relay 7. The circuit breaker (not shown), which is generally of the fluid-break type, is mounted behind the partition 4 and is operatively connected to the operating mechanism 5 through an opening 8 in the partition.

The movable panel 2 comprises an instrument and meter panel, and is provided with the usual meters, signal lights, and controls on the front side thereof, the rear or inside face of the panel having mounted thereon suitable connections, terminals, etc., as the resistors 9, fuse blocks 10, lamp socket structure 12, and other apparatus which form no part of my present invention.

The flexible low tension lead conductors 13 connected to the electrical control and operating mechanism mounted on the partition 4, and to other parts of the system, are likewise connected to various elements on the control panel and the connections 13' are accordingly subject to a certain amount of bending flexing when the panel 2 is swung on its hinges during opening and closing movement thereof. For the purpose of mounting and guiding the conductors so that the connections shall not be effected by swinging of the panel 2 there are provided angle members 14 and 15 mounted opposite each other on the panel and stationary structure respectively. The angle members are preferably formed of sheet metal and the portions extending transversely of the bases are provided with apertures 16 for a purpose hereinafter described. The angle member 14 referring to Fig. 3, is preferably mounted closer to the hinged connection 3 than the angle member 15, which is carried by an angle bar 17 forming a part of the side wall of the cubicle.

Referring more particularly to Fig. 2, each angle member comprises a base portion on which is mounted a terminal block, 18 having individual recesses 18' for receiving and connecting in a suitable manner the conductors to associated leads. The apertures 16 in the plate-like portion of the member extending transversely of the base are each fitted with an insulating bushing 19 of suitable material, as rubber or a phenol condensation product. The flexible connections for the lead conductors are adapted to extend through the insulating bushings in a bundle, as from two to four conductors, and are fanned out into their respective recesses in the terminal block. For the purpose of preventing undue flexing of the conductors 13' and for presenting a neat appearance, the conductors extending through a single bushing are tied together, or corded, as at 20 in the loop formed between the angle members. As illustrated in Fig. 1, the conductors 13' extending from the cubicle to the panel are guided in corresponding bushings opposite each other in the respective angle members in order to prevent twisting or bending of the conductors and loosening of the terminal connections at the terminal blocks. They are also provided with a certain amount of slack even when the panel is in its open position to prevent stretching of the conductors and insulation thereon. When the panel 2 is in its closed position, as illustrated in Fig. 3, the mounting and guiding portions for the conductors are at a right angle with respect to each other and allow the conductors to assume a slack loop, which precludes excessive bending or flexing stresses in the conductors. It will be apparent that practically no bending or flexing stresses whatever will be transmitted to the terminal blocks through the insulating bushings so that loosening of the terminal connections due to this cause is practically obviated.

While I have shown but a single pair of angle members for the lead conductors, it is of course understood that any desirable number may be employed, as by extending the same in vertical rows on the panel and cubicle wall respectively.

What I claim as new and desire to secure by Letters Patent of the United States is:—

1. A mounting for flexible lead conductors extending between a stationary structure and a panel hinged thereon, comprising angle members mounted on the stationary structure and panel respectively, and means forming a part of said members for guiding and spacing individual conductors with respect to said stationary structure and panel and to each other, said angle members being mounted adjacent the hinged connection between the stationary structure and panel and substantially parallel thereto.

2. A mounting for flexible low-tension lead conductors extending between a stationary structure and a panel vertically hinged thereon, comprising metallic angle members vertically mounted on the stationary structure and panel respectively, insulating bushings mounted in one side of each of said members for guiding and spacing the flexible conductors, and terminal blocks mounted upon the other side of each of said members, the respective sides of the members through which the conductors extend being substantially at right angles to each other when the panel is in its closed position.

3. In switch panels of the cubicle type comprising a stationary structure having mounted thereon control mechanism and a hinged instrument panel, means for guiding and supporting flexible low-tension lead conductors extending between the control mechanism and the instrument panel comprising members mounted on the stationary structure and panel respectively, the portions of said members extending from the base portions thereof being provided with guiding apertures spacing said conductors with respect to said stationary structure and panel respectively.

4. In switch panels of the cubicle type comprising a stationary structure having mounted thereon control mechanism and a hinged instrument panel, means for guiding and supporting low-tension lead conductors interconnecting the control mechanism and the rear of the instrument panel, comprising angle members vertically mounted on the stationary structure and instrument panel respectively, said members being provided with guiding apertures along one side thereof for said conductors, the angle member on the instrument panel being mounted adjacent its hinged connection as compared with the member mounted on the stationary structure.

5. In a cubicle for electrical apparatus comprising a stationary structure and a panel hinged to and associated with said structure, means for supporting and guiding flexible low tension lead conductors from said stationary structure to said panel comprising a plate member secured to and extending transversely of the inner side of said panel, and a second plate member secured to and extending transversely of a side wall of said cubicle, said plates disposed opposite each other and adjacent the hinged mounting of the panel, the plates being provided with apertures for receiving and guiding the flexible conductors and spacing said conductors with respect to said stationary structure and panel respectively.

6. In a cubicle for electrical apparatus comprising a stationary structure and a panel hinged to said structure, means for supporting and guiding flexible low tension lead conductors from the stationary structure to the panel, comprising angle members mounted on said panel and structure respectively, said members disposed opposite each other and adjacent the hinged mounting of the panel, insulating bushings mounted within the portions of said members extending transversely of the mounting thereof, and terminal blocks having connections for the conductors mounted on the base portions of said members, said bushings adapted each to receive a plurality of conductors extending between the angle members, the flexible conductors having corded portions and forming a slack loop between said members whereby loosening of the conductors at said terminal blocks and excessive bending stresses therein, due to opening and closing movement of the panel, are substantially precluded.

In witness whereof, I have hereunto set my hand this third day of March, 1930.

JAMES H. POWERS.